US 8,547,515 B2

(12) United States Patent
Kim et al.

(10) Patent No.: US 8,547,515 B2
(45) Date of Patent: Oct. 1, 2013

(54) DISPLAY SUBSTRATE WITH PIXEL ELECTRODE HAVING V-SHAPE AND TRAPEZOIDAL PROTRUSIONS, A METHOD OF MANUFACTURING THE SAME AND A DISPLAY APPARATUS HAVING THE SAME

(75) Inventors: Sung-Hoon Kim, Seoul (KR); Il-Yong Yoon, Seoul (KR); Yong-Woo Lee, Seoul (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 788 days.

(21) Appl. No.: 12/368,809

(22) Filed: Feb. 10, 2009

(65) Prior Publication Data

US 2009/0279036 A1    Nov. 12, 2009

(30) Foreign Application Priority Data

May 8, 2008    (KR) .................. 10-2008-0042688

(51) Int. Cl.
*G02F 1/1343*    (2006.01)

(52) U.S. Cl.
USPC ........... 349/144; 349/141; 349/142; 349/143; 349/146

(58) Field of Classification Search
USPC .................................... 349/144, 141–14, 146
See application file for complete search history.

(56) References Cited

U.S. PATENT DOCUMENTS

| | | | | |
|---|---|---|---|---|
| 5,905,556 A * | 5/1999 | Suzuki et al. | ................. | 349/141 |
| 6,803,981 B2 * | 10/2004 | Lee et al. | ...................... | 349/129 |
| 6,833,899 B2 * | 12/2004 | Sunohara et al. | ............. | 349/142 |
| 2003/0128323 A1 * | 7/2003 | Matsumoto et al. | .......... | 349/141 |
| 2004/0233360 A1 * | 11/2004 | Yoshida et al. | ............... | 349/114 |
| 2008/0036932 A1 * | 2/2008 | Lee | .................................. | 349/38 |
| 2008/0198285 A1 * | 8/2008 | Hsieh et al. | ..................... | 349/39 |

FOREIGN PATENT DOCUMENTS

| | | |
|---|---|---|
| JP | 2007-249202 | 9/2007 |
| KR | 1020060099635 | 9/2006 |
| KR | 1020070030867 | 3/2007 |

* cited by examiner

*Primary Examiner* — Hoan C Nguyen
(74) *Attorney, Agent, or Firm* — F. Chau & Associates, LLC (57) ABSTRACT

A display substrate includes a transparent substrate, a gate line formed on the transparent substrate, a data line crossing the gate line, a thin film transistor electrically connected to the gate line and the data line, and a pixel electrode. The pixel electrode includes a body electrode section electrically connected to the thin film transistor and a plurality of protruding electrodes protruding from the body electrode section. Each of the protruding electrodes includes a trapezoidal electrode having two sides that are inclined with respect to a protrusion direction that is a lengthwise direction of the body electrode section.

9 Claims, 7 Drawing Sheets

DISPLAY SUBSTRATE WITH PIXEL ELECTRODE HAVING V-SHAPE AND TRAPEZOIDAL PROTRUSIONS, A METHOD OF MANUFACTURING THE SAME AND A DISPLAY APPARATUS HAVING THE SAME

CROSS-REFERENCE TO RELATED APPLICATION

This application claims priority under 35 USC §119 to Korean Patent Application No. 2008-42688, filed on May 8, 2008 in the Korean Intellectual Property Office (KIPO), the disclosure of which is incorporated by reference herein in its entirety.

BACKGROUND OF THE INVENTION

1. Technical Field

The present invention relates to a display substrate for a liquid crystal display apparatus, a method of manufacturing the display substrate and a display apparatus having the display substrate.

2. Discussion of the Related Art

A liquid crystal display apparatus includes a liquid crystal display panel for displaying images by using light, and a backlight assembly for providing the liquid crystal display panel with the light.

The liquid crystal display panel includes a first substrate having thin-film transistors and pixel electrodes, a second substrate opposite to the first substrate and having a common electrode, and a liquid crystal layer disposed between the first and second substrates.

The pixel electrodes are formed in unit pixels, respectively. Each of the pixel electrodes may include a plurality of sub pixel electrodes spaced apart from each other for enhancing a viewing angle of the liquid crystal display panel. However, when the sub pixel electrodes are spaced apart from each other, an opening region is formed between the sub pixel electrodes, which lowers an optical transmissivity of the liquid crystal display panel.

Each of the sub pixel electrodes may have a plurality of protruding electrodes protruding along one direction to prevent the optical transmissivity from decreasing. For example, when each of the sub pixel electrodes includes the protruding electrodes, the opening region of the pixel electrode is reduced to minimize the loss of optical transmissivity of the liquid crystal display panel However, when each of the sub pixel electrodes includes the protruding electrodes, the ability of the sub pixel electrodes to control liquid crystal molecules of the liquid crystal layer may be weakened. Therefore, a response speed of the liquid crystal molecules may be reduced which deteriorates a display quality of the liquid crystal display panel.

Accordingly, there is a need for a display substrate capable of improving the response speed of the liquid crystal molecules to enhance a display quality of a liquid crystal display panel.

SUMMARY OF THE INVENTION

According to an exemplary embodiment of the present invention, a display substrate includes a transparent substrate, a gate line formed on the transparent substrate, a data line crossing the gate line, a thin film transistor electrically connected to the gate line and the data line, and a pixel electrode.

The pixel electrode includes a body electrode section electrically connected to the thin film transistor and a plurality of protruding electrodes protruding from the body electrode section. Each of the protruding electrodes includes a trapezoidal electrode having two sides that are inclined with respect to a protrusion direction that is a lengthwise direction of the body electrode section. Each of the protruding electrodes further includes a rectangular electrode connected to the trapezoidal electrode.

The rectangular electrode may be connected between the body electrode section and the trapezoidal electrode. The rectangular electrode may be connected to an upper end of the trapezoidal electrode, wherein a lower end of the trapezoidal electrode is connected to the body electrode section.

The rectangular electrode may include a lower rectangular electrode and an upper rectangular electrode. The lower rectangular electrode may be disposed between the body electrode section and a lower end of the trapezoidal electrode to connect the trapezoidal electrode to the body electrode section, and the upper rectangular electrode may be connected to an upper end of the trapezoidal electrode.

The lower and upper rectangular electrodes have substantially the same height. The height of each of the lower and upper rectangular electrodes may be in a range of about 15% to about 25% of a length of the protruding electrode.

The trapezoidal electrode may include a lower trapezoidal electrode and an upper trapezoidal electrode. The lower trapezoidal electrode may be connected to an upper end of the lower rectangular electrode and have two sides that are inclined with respect to the protrusion direction, and the upper trapezoidal electrode may be connected between the lower trapezoidal electrode and a lower end of the upper rectangular electrode along the protrusion direction and have two sides that are inclined with respect to the protrusion direction. The trapezoidal electrode may have a sandglass shape having a center portion that is narrower than its upper and lower portions.

The trapezoidal electrode may have an isosceles trapezoidal shape symmetric with respect to the protrusion direction.

A width of a lower portion of the protruding electrode, which is connected to the body electrode section, may be substantially greater than a width of an upper portion of the protruding electrode. A distance between the lower portions of adjacent protruding electrodes may be in a range of about 3.0 μm to about 4.0 μm.

According to an exemplary embodiment of the present invention, a gate line is formed on a transparent substrate, a data line crossing the gate line is formed and a thin film transistor that is electrically connected to the gate line and the data line is formed. Then, a pixel electrode is formed. The pixel electrode includes a body electrode section electrically connected to the thin film transistor and a plurality of protruding electrodes protruding from the body electrode section. Each of the protruding electrodes includes a trapezoidal electrode having two sides that are inclined with respect to a protrusion direction that is a lengthwise direction of the body electrode section and a rectangular electrode connected to the trapezoidal electrode.

According to an exemplary embodiment of the present invention, a display apparatus includes a first substrate, a second substrate that is opposite to the first substrate and a liquid crystal layer disposed between the first and second substrates.

The first substrate has a transparent substrate, a gate line formed on the transparent substrate, a data line crossing the gate line, a thin film transistor electrically connected to the gate line and the data line, and a pixel electrode electrically connected to the thin film transistor. The pixel electrode comprises a body electrode section electrically connected to the thin film transistor and a plurality of protruding electrodes protruding from the body electrode section, each of the protruding electrodes including a trapezoidal electrode having two sides that are inclined with respect to a protrusion direction that is a lengthwise direction of the body electrode section and a rectangular electrode connected to the trapezoidal electrode.

The second substrate may include a common electrode having a domain dividing groove dividing a region between the common electrode and the pixel electrode into a plurality of domains.

The rectangular electrode may include a lower rectangular electrode disposed between the body electrode section and a lower end of the trapezoidal electrode to connect the trapezoidal electrode to the body electrode section, and an upper rectangular electrode connected to an upper end of the trapezoidal electrode. A height of each of the lower and upper rectangular electrodes may be in a range of about 15% to about 25% of a length of the protruding electrode.

According to an exemplary embodiment of the present invention, a display substrate includes a transparent substrate, a gate line formed on the transparent substrate, a data line crossing the gate line, a thin film transistor electrically connected to the gate line and the data line, and a pixel electrode.

The pixel electrode includes a body electrode section electrically connected to the thin film transistor and a plurality of protruding electrodes protruding from the body electrode section. Each of the protruding electrodes includes a trapezoidal electrode, the trapezoidal electrode including a lower trapezoidal electrode connected to the body electrode section and having two sides that are inclined with respect to a protrusion direction that is a lengthwise direction of the body electrode section and an upper trapezoidal electrode connected to the lower trapezoidal electrode and having two sides that are inclined with respect to the protrusion direction.

The trapezoidal electrode may have a sandglass shape having a center portion that is narrower than its upper and lower portions.

Each of the upper and lower trapezoidal electrodes may have an isosceles trapezoidal shape symmetric with respect to the protrusion direction.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF EXEMPLARY EMBODIMENTS

Exemplary embodiments of the present invention are described more fully hereinafter with reference to the accompanying drawings. The present invention may, however, be embodied in many different forms and should not be construed as limited to the embodiments set forth herein.

It will be understood that when an element or layer is referred to as being "on," "connected to" or "coupled to" another element or layer, it can be directly on, connected or coupled to the other element or layer or intervening elements or layers may be present.

Figure 1:
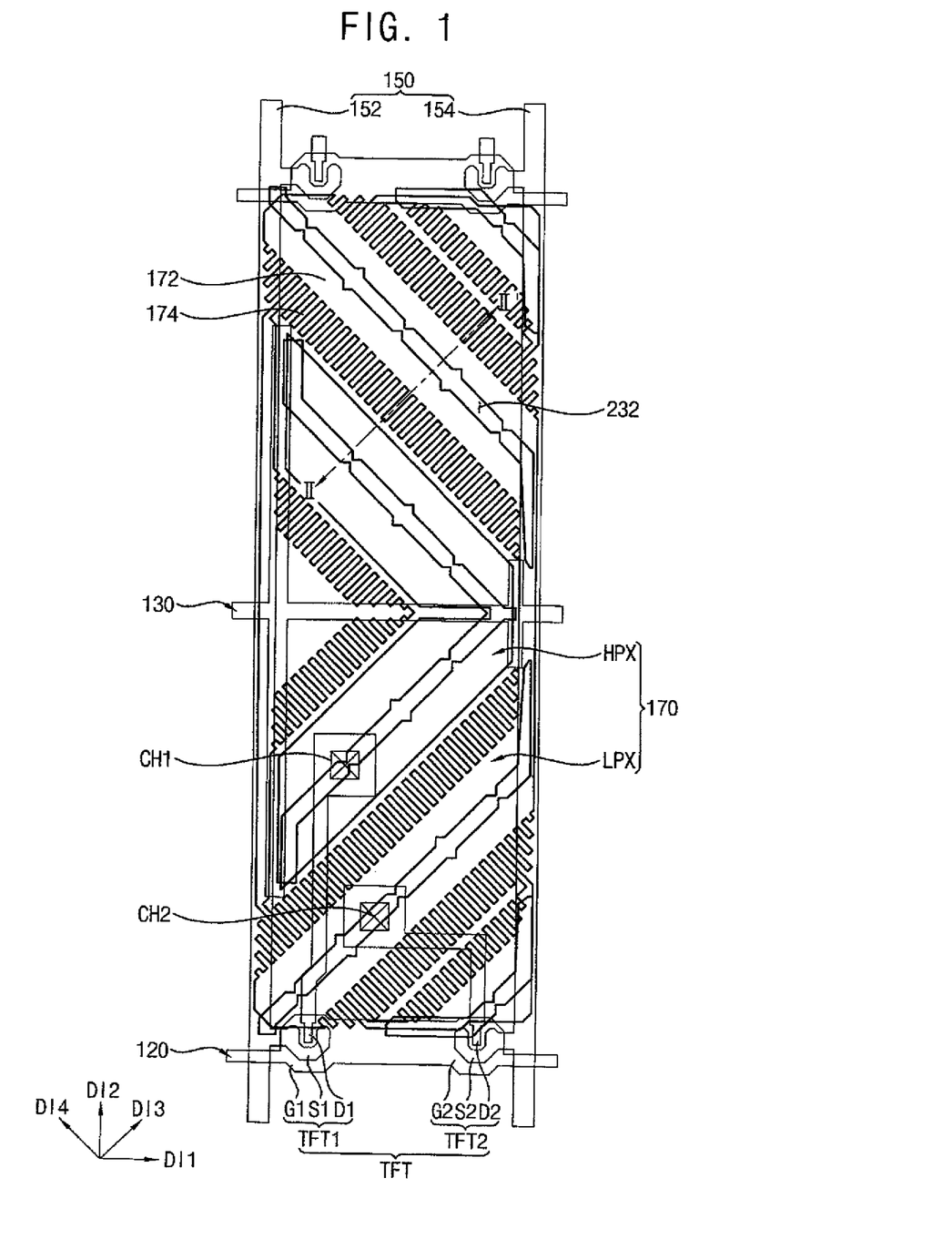
FIG. 1 is a plan view illustrating a display apparatus according to an exemplary embodiment of the present invention.
Figure 2:
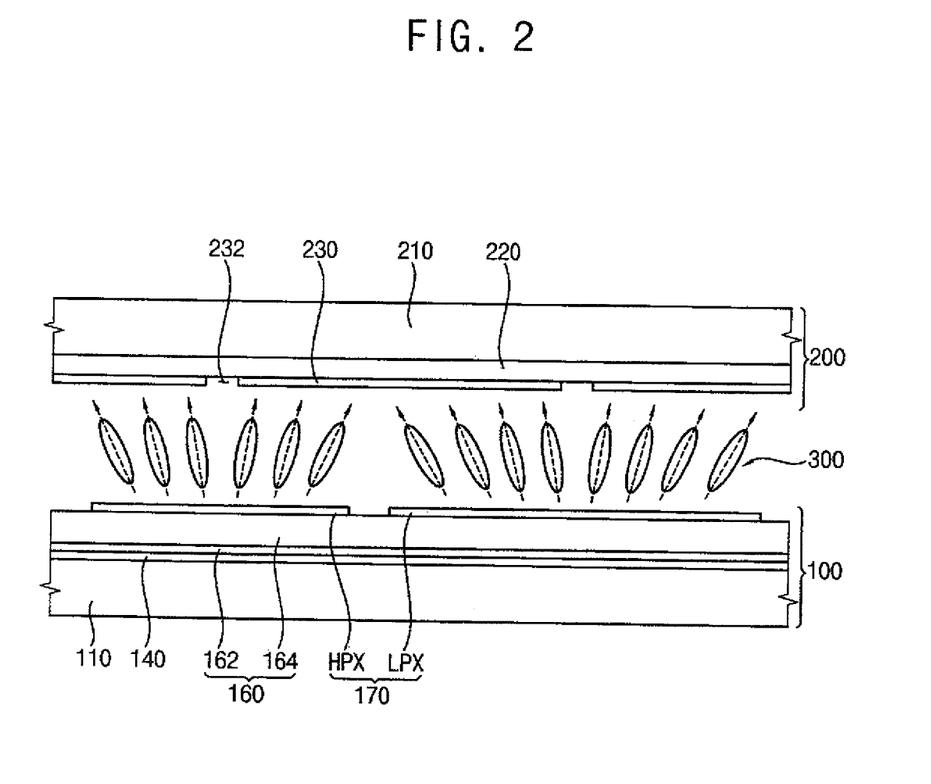
FIG. 2 is a cross-sectional view taken along line II-II' in FIG. 1.

FIG. 1 is a plan view illustrating a display apparatus according to an exemplary embodiment of the present invention, and FIG. 2 is a cross-sectional view taken along line II-II' in FIG. 1.

Referring to FIGS. 1 and 2, a display apparatus according to the present exemplary embodiment includes a first substrate 100, a second substrate 200 opposite to the first substrate 100, and a liquid crystal layer 300 disposed between the first substrate 100 and the second substrate 200.

The first substrate 100 includes a first transparent substrate 110, a driver circuit section (not shown), a gate insulation layer 140, a protection layer 160 and a pixel electrode 170. The driver circuit section is electrically connected to the pixel electrode 170. The driver circuit section may include a gate line 120, a storage line 130, a data line 150 and a thin-film transistor TFT.

The first transparent substrate 110 has a plate shape. The first transparent substrate 110 includes optically transparent material. For example, the first transparent substrate 110 may include glass, quartz or transparent synthetic resin.

The gate line 120 is formed on the first transparent substrate 110, and extends along a first direction DI1. The storage line 130 is formed on the first transparent substrate 110 along the first direction DI1 such that the storage line 130 is spaced apart from the gate line 120 to be overlapped with the pixel electrode 170. A portion of the storage line 130 may extend along a direction that crosses the first direction DI1 to increase an overlapping area of the pixel electrode 170 and the storage line 130.

The gate insulation layer 140 is formed on the first transparent substrate 110 to cover the gate line 120 and the storage line 130. The gate insulation layer 140 may include for example, silicon oxide (SiOx) or silicon nitride (SiNx).

The data line 150 is formed on the gate insulation layer 140, and extends along a second direction DI2 that crosses the first direction DI1. The second direction DI2 is, for example, substantially perpendicular to the first direction DI1.

For example, the data line 150 may include first and second data lines 152 and 154 adjacent to each other. The first data line 152 may transfer a first data voltage, and the second data line 154 may transfer a second data voltage that is lower than the first data voltage.

The thin-film transistor TFT is electrically connected to the gate line 120, the data line 150 and the pixel electrode 170. For example, the thin-film transistor TFT may include a first transistor TFT1 electrically connected to the first data line 152, and a second transistor TFT2 electrically connected to the second data line 154.

The first transistor TFT1 includes a first gate electrode G1, a first active pattern (not shown), a first source electrode S1 and a first drain electrode D1. The first gate electrode G1 is electrically connected to the gate line 120. The first active pattern is formed on the gate insulation layer 140 to be overlapped with the first gate electrode G1. The first source electrode S1 is electrically connected to the first data line 152 and overlapped with the first active pattern. The first drain electrode D1 is spaced apart from the first source electrode S1 and overlapped with the first active pattern. The first drain electrode D1 may extend along the second direction DI2.

The second transistor TFT2 includes a second gate electrode G2, a second active pattern (not shown), a second source electrode S2 and a second drain electrode D2. The second gate electrode G2 is electrically connected to the gate line 120. The second active pattern is formed on the gate insulation layer 140 to be overlapped with the second gate electrode G2. The second source electrode 82 is electrically connected to the second data line 154, and overlapped with the second active pattern. The second drain electrode D2 is spaced apart from the second source electrode S2, and overlapped with the second active pattern. The second drain electrode D2 may extend along the second direction DI2.

The protection layer 160 may be formed on the gate insulation layer 140 to cover the data line 150 and the thin-film transistor TFT. The protection layer 160 may have a first contact hole CH1 exposing a portion of the first drain electrode D1, and a second contact hole CH2 exposing a portion of the second drain electrode D2.

The protection layer 160 may include a passivation layer 162 and an organic insulation layer 164. The passivation layer 162 is formed on the gate insulation layer 140 to cover the data line 150 and the thin-film transistor TFT. The organic insulation layer 164 is formed on the passivation layer 162. The protection layer 160 may include only one of the passivation layer 162 and the organic insulation layer 164.

The pixel electrode 170 is formed on the protection layer 160 in a unit pixel. The pixel electrode 170 is electrically connected to the drain electrode of the thin-film transistor TFT through a contact hole of the protection layer 160. The pixel electrode 170 may include an optically transparent and electrically conductive material.

The pixel electrode 170 may include a high voltage pixel electrode HPX and a low voltage pixel electrode LPX. The high voltage pixel electrode HPX is electrically connected to the first data line 152 through the first contact hole CH1, and the low voltage pixel electrode LPX is electrically connected to the second data line 154 through the second contact hole CH2.

The high voltage pixel electrode HPX may have a symmetrical shape with respect to a virtual line passing through the unit pixel along the first direction DI1. For example, the high voltage pixel electrode HPX may have a V-shape symmetric with respect to the virtual line.

The low voltage pixel electrode LPX is spaced apart from the high voltage pixel electrode HPX. The low voltage pixel electrode LPX may have a shape surrounding the high voltage pixel electrode HPX. The low voltage pixel electrode LPX may have a V-shape symmetric with respect to the virtual line.

The low voltage pixel electrode LPX may have an area larger than the high voltage pixel electrode HPX. The low voltage pixel electrode LPX includes at least one first pixel body and at least one second pixel body. The first pixel body extends along a third direction DI3 between the first and second directions DI1 and DI2, and the second pixel body extends along a fourth direction DI4 that is substantially perpendicular to the third direction DI3. For example, the first pixel body may be disposed at a lower portion of the high voltage pixel electrode HPX, and the second pixel body may be disposed at an upper portion of the high voltage pixel electrode HPX.

Each of the first and second pixel bodies includes a body electrode section 172 and a plurality of protruding electrodes 174. The body electrode section 172 extends along the third direction DI3 or the fourth direction DI4. The protruding electrodes 174 protrude from the body electrode section 172 along a direction substantially perpendicular to a lengthwise direction of the body electrode section 172.

According to the present exemplary embodiment, only the low voltage pixel electrode LPX includes the body electrode section 172 and the protruding electrodes 174. However, the high voltage pixel electrode HPX may include the body electrode section 172 and the protruding electrodes 174.

The second substrate 200 may include a second transparent substrate 210, a light-blocking pattern (not shown), a color filter 220 and a common electrode 230.

The second transparent substrate 210 is disposed opposite to the first substrate 100. The second transparent substrate 210 has a plate shape, and includes optically transparent material. For example, the second transparent substrate 210 may include glass, quartz or transparent synthetic resin.

The light-blocking pattern is formed on a face of the second transparent substrate 210, which faces the first substrate 100, to cover the gate line 120, the data line 150 and the thin-film transistor TFT. The light-blocking pattern may be a black matrix for blocking light.

The color filter 220 is formed on the face of the second transparent substrate 210, which faces the first substrate 100 to be disposed over the pixel electrode 170. The color filter 220 may include a red color filter, a green color filter and a blue color filter.

The common electrode 230 is formed on the light-blocking pattern and the color filter 220. The common electrode 230 includes an optically transparent and electrically conductive material, and receives a common voltage from an external device.

The common electrode 230 may have a domain dividing groove 232 dividing a region between the pixel electrode 170 and the common electrode 230 to form a plurality of domains. The domain dividing groove 232 may extend along the third direction DI3 or the fourth direction DI4 to divide the high voltage pixel electrode HPX or the low voltage pixel electrode LPX into two domains.

The liquid crystal layer 300 is disposed between the first and second substrates 100 and 200. Liquid crystal molecules of the liquid crystal layer 300 are rearranged when an electric field is generated between the pixel electrode 170 and the common electrode 230.

Figure 3:
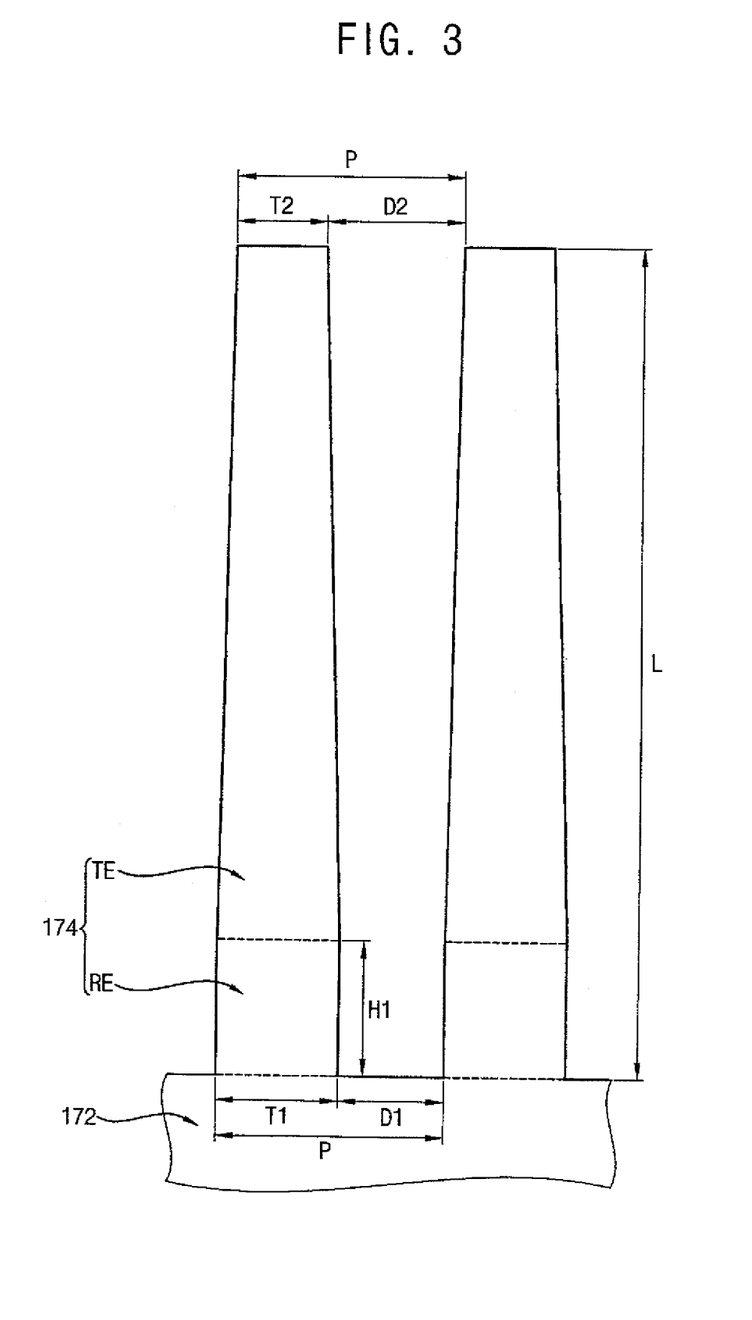
FIG. 3 is an enlarged plan view illustrating a protruding electrode of a pixel electrode in FIG. 1.

FIG. 3 is an enlarged plan view illustrating a protruding electrode of a pixel electrode in FIG. 1.

Referring to FIG. 3, the protruding electrodes 174 extend from the body electrode section 172 along a protruding direction. For example, the protruding direction is the third direction DI3 or the fourth direction DI4 in FIG. 1.

The protruding electrode 174 may have a protrusion length L in a range of about 25 μm to about 27 μm. For example, the protruding electrode 174 has the protrusion length L of about 26 μm. An interval P between the protruding electrodes 174 may have a range of about 7.5 μm to about 8.5 μm. For example, the interval P between the protruding electrodes 174 is about 8 μm.

The protruding electrode 174 includes a rectangular electrode RE and a trapezoidal electrode TE. The rectangular electrode RE is connected with the body electrode section 172, and has a rectangular shape when viewed on a plane. The trapezoidal electrode TE is connected to the rectangular electrode RE along the protrusion direction. The trapezoidal electrode TE has two sides that are inclined with respect to the protrusion direction. For example, the trapezoidal electrode TE may have an isosceles trapezoidal shape symmetric with respect to the protrusion direction.

A height H1 of the rectangular electrode RE is about 15% to about 25% of the protrusion length L of the protruding electrode 174. For example, the height H1 of the rectangular electrode RE is about 20% of the protrusion length L. In detail, the height H1 of the rectangular electrode RE may be in a range of about 3.9 μm to about 6.5 μm, and for example, the height H1 of the rectangular electrode RE is about 5.2 μm.

A lower spacing distance D1 between lower portions of the protruding electrodes 174 is substantially equal to or greater than about 3 μm due to a limitation of resolution power when exposed, and in general, equal to or greater than about 3.5 μm. An upper spacing distance D2 between upper portions of the protruding electrodes 174 is substantially equal to or greater than the lower spacing distance D1.

A sum of a lower width T1 and the lower spacing distance D1 is substantially the same as the interval P of the protruding electrodes 174. Likewise, a sum of an upper width T2 and the upper spacing distance D2 is substantially the same as the interval P of the protruding electrodes 174. Therefore, the upper width T2 of the protruding electrode 174 is substantially equal to or smaller than the lower width T1 of the protruding electrode 174.

For example, when the lower spacing distance D1 is about 3.5 μm, and the interval P of the protruding electrodes 174 is about 8 μm, the lower width T1 of the protruding electrode 174 is about 4.5 μm. When the upper width T2 of the protruding electrode 174 is about 3.5 μm that is smaller than the lower width T1 of the protruding electrode 174, the upper spacing distance D2 is about 4.5 μm.

When the lower spacing distance D1 is about 4.1 μm and the interval P of the protruding electrodes 174 is about 8.2 μm, the lower width T1 of the protruding electrode 174 is about 4.1 μm. In other words, even when the lower spacing distance D1 is substantially equal to or greater than about 4.0 μm, the lower width T1 of the protruding electrode 174 may be substantially equal to or greater than about 4.0 μm.

Hereinafter, a method of manufacturing the first substrate 100 in FIGS. 1 to 3 will be explained.

Referring again to FIGS. 1 to 3, a gate metal layer is formed on the first transparent substrate 110, and the gate metal layer is patterned to form a gate metal pattern The gate metal pattern includes the gate line 120, the storage line 130, the first gate electrode G1 and the second gate electrode G2.

Then, the gate insulation layer 140 is formed on the first transparent substrate 110 to cover the gate metal pattern.

Then, an active layer is formed on the gate insulation layer 140, and the active layer is patterned to form the active pattern (not shown). The active pattern includes the first active pattern (not shown) and the second active pattern (not shown).

Then, a data metal layer is formed on the gate insulation layer 140 to cover the active pattern, and the data metal layer is patterned to form a data metal pattern. The data metal pattern includes the first data line 152, the second data line 154, the first source electrode S1, the first drain electrode D1, the second source electrode S2 and the second drain electrode D2.

Then, the protection layer 160 is formed on the gate insulation layer 140 to cover the data metal pattern, and portions of the protection layer 160 are removed to form the first contact hole CH1 exposing a portion of the first drain electrode D1, and the second contact hole CH2 exposing a portion of the second drain electrode D2. The protection layer 160 may include the passivation layer 162 and the organic insulation layer 164.

Then, a pixel electrode layer is formed on the protection layer 160, and the pixel electrode layer is patterned through a photolithography process to form the pixel electrode 170.

The pixel electrode 170 may include the high voltage pixel electrode HPX electrically connected to the first data line 152 through the first contact hole CH1, and the low voltage pixel electrode LPX electrically connected to the second data line 154 through the second contact hole CH2.

The low voltage pixel electrode LPX includes the body electrode section 172 extended along the third direction DI3 or the fourth direction DI4, and a plurality of protruding electrodes 174 protruding from the body electrode section 172 along a direction that is substantially perpendicular to a lengthwise direction of the body electrode section 172.

The protruding electrode 174 includes the rectangular electrode RE connected to the body electrode section 172, and the trapezoidal electrode TE connected to the rectangular electrode RE along the protrusion direction and having two sides that are inclined with respect to the protrusion direction. The lower spacing distance D1 between lower portions of the protruding electrodes 174 is substantially equal to or greater than about 3 μm due to a limitation of resolution power when exposed, and in general, equal to or greater than about 3.5 μm.

According to the present exemplary embodiment, the trapezoidal electrode TE of the protruding electrode 174 controls an initial direction of the liquid crystal molecules by the two sides that are inclined with respect to the protrusion direction, so that the response speed of the liquid crystal molecules is improved. In detail, when an angle between one of the two sides of the trapezoidal electrode TE and the protrusion direction increases, a force for controlling the initial direction of the liquid crystal molecules increases. In other words, when the angle between one of the two sides of the trapezoidal electrode TE and the protrusion direction increases, the response speed of the liquid crystal molecules also increases.

When the protrusion length L of the protruding electrode 174 is constant, the angle between one of the two sides of the trapezoidal electrode TE and the protrusion direction increases as a difference between the lower width T1 of the protruding electrode 174 and the upper width T2 of the protruding electrode 174 increases. Therefore, when the difference between the lower width T1 of the protruding electrode 174 and the upper width T2 of the protruding electrode 174 increases, the force for controlling the initial direction of the liquid crystal molecules increases.

To increase the difference between the lower width T1 of the protruding electrode 174 and the upper width T2 of the protruding electrode 174, the lower width T1 of protruding electrode 174 is increased or the upper width T2 of the protruding electrode 174 is decreased.

When the interval P of the protruding electrodes 174 is constant at about 8 μm, the lower spacing distance D1 is no smaller than about 3.5 μm due to the limitation of resolution power when exposed, so that a maximum value of the lower width T1 of the protruding electrode 174 is about 4.5 μm. In other words, the lower width T1 of the protruding electrode 174 is no greater than about 4.5 μm.

Additionally, the upper width T2 of the protruding electrode 174 is no greater than the lower width T1 of the protruding electrode 174. Therefore, the width T2 of the protruding electrode 174 has a value in a range of about 0 μm to about 4.5 μm. However, when the upper width T2 of the protruding electrode 174 is too small, opening regions between the protruding electrodes 174 enlarge to lower transmissivity of light Therefore, the upper width T2 of the protruding electrode 174 may have a range of about 3.5 μm to about 4.5 μm, since the upper width T2 is, in general, no smaller than about 3.5 μm.

As described above, the maximum value of the lower width T1 of the protruding electrode 174 is about 4.5 μm, and the minimum value of the upper width T2 of the protruding electrode 174 is about 3.5 μm, so that a maximum difference between the lower width T1 of the protruding electrode 174 and the upper width T2 of the protruding electrode 174 is about 1 μm. In other words, the difference between the lower width T1 of the protruding electrode 174 and the upper width T2 of the protruding electrode 174 is limited.

According to the present exemplary embodiment, the protruding electrode 174 includes the rectangular electrode RE. Therefore, when the protrusion length L of the protruding electrode 174 is constant, the height of the trapezoidal electrode TE decreases by an amount of the height H1 of the rectangular electrode RE. Therefore, when the height of the trapezoidal electrode TE decreases, the angle between one of the two sides of the trapezoidal electrode TE and the protrusion direction increases to improve the response speed of the liquid crystal molecules, even though the difference between the lower width T1 of the protruding electrode 174 and the upper width T2 of the protruding electrode 174 is constant.

In addition, the response speed of the liquid crystal molecules corresponding to the rectangular electrode RE may be improved due to a strong electric field, since the rectangular electrode RE is electrically connected to the body electrode section 172.

Figure 4:
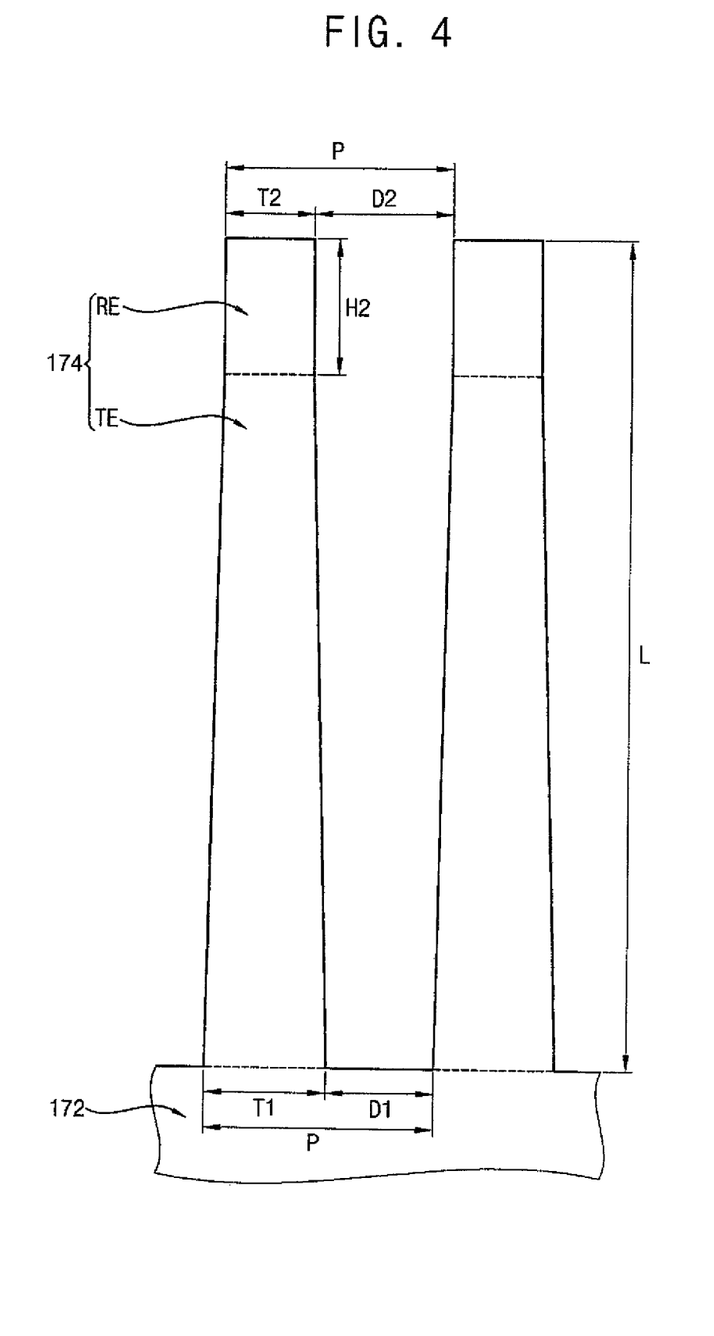
FIG. 4 is an enlarged plan view illustrating a protruding electrode of a pixel electrode for a display apparatus according to an exemplary embodiment of the present invention.

FIG. 4 is an enlarged plan view illustrating a protruding electrode of a pixel electrode for a display apparatus according to an exemplary embodiment of the present invention.

The display apparatus according to the present exemplary embodiment is substantially the same as the display apparatus in FIGS. 1 to 3, except for the protruding electrode 174. Therefore, the same reference numerals will be used to refer to substantially the same elements, and thus any further description thereof will be omitted.

Referring to FIG. 4, the protruding electrodes 174 according to the present exemplary embodiment protrude from the body electrode section 172 along a protrusion direction. The protrusion direction may be the third direction DI3 or the fourth direction DI4 in FIG. 1.

The protrusion length L of the protruding electrode 174 may have a range of about 25 μm to about 27 μm. For example, the protrusion length L of the protruding electrode 174 may be about 26 μm. The interval P between the protruding electrodes 174 may have a range of about 7.5 μm to about 8.5 μm. For example, the interval P between the protruding electrodes 174 is about 8 μm.

The protruding electrode 174 includes a rectangular electrode RE and a trapezoidal electrode TE. The trapezoidal electrode TE is connected to the body electrode section 172, and has two sides that are inclined with respect to the protrusion direction. For example, the trapezoidal electrode TE may have an isosceles trapezoidal shape symmetric with respect to the protrusion direction. The rectangular electrode RE is connected to the trapezoidal electrode TE, and has a rectangular shape when viewed on a plane.

The height H2 of the rectangular electrode RE may be about 15% to about 25% of the protrusion length L of the protruding electrode 174. For example, the height H2 of the rectangular electrode RE may be about 20% of the protrusion length L. In detail, the height H2 of the rectangular electrode RE may be in a range of about 3.9 μm to about 6.5 μm. For example, the height H2 of the rectangular electrode RE may be about 5.2 μm.

The lower spacing distance D1 between lower portions of the protruding electrodes 174 is no smaller than about 3 μm due to a limitation of resolution power when exposed. The lower spacing distance D1 is about 3.5 μm in general. The upper spacing distance D2 between upper portions of the protruding electrodes 174 is substantially equal to or greater than the lower spacing distance D1.

A sum of a lower width Ti of the protruding electrode 174 and the lower spacing distance D1 of the protruding electrode 174 is substantially the same as the interval P of the protruding electrodes 174. Likewise, a sum of an upper width T2 of the protruding electrode 174 and the upper spacing distance D2 of the protruding electrode 174 is substantially the same as the interval P of the protruding electrodes 174. Therefore, the upper width T2 of the protruding electrode 174 is substantially equal to or smaller than the lower width T1 of the protruding electrode 174.

When the lower spacing distance D1 is about 4.1 μm and the interval P of the protruding electrodes 174 is about 8.2 μm, the lower width T1 of the protruding electrode 174 is about 4.1 μm. In other words, even when the lower spacing distance D1 is substantially equal to or greater than about 4.0 μm, the lower width T1 of the protruding electrode 174 may be substantially equal to or greater than about 4.0 μm.

Hereinafter, a method of manufacturing the first substrate 100 in FIGS. 1, 2 and 4 will be explained. The method of manufacturing the first substrate 100 according to the present exemplary embodiment is substantially the same as the method of manufacturing the first substrate 100 in FIGS. 1 to 3 except for a step of forming the pixel electrode 170. Therefore, just the step of forming the pixel electrode 170 will be described.

Referring again to FIG. 4, a pixel electrode layer is formed on a protection layer 160 after the protection layer 160 is formed, and the pixel electrode layer is patterned through a photolithography process to form the pixel electrode 170.

The pixel electrode 170 may include the high voltage pixel electrode HPX and the low voltage pixel electrode LPX. The low voltage pixel electrode LPX includes a body electrode section 172 and a plurality of protruding electrodes 174. The body electrode section 172 extends along the third direction DI3 or the fourth direction DI4. The protruding electrodes 174 protrude from the body electrode section 172 along a direction substantially perpendicular to a lengthwise direction of the body electrode section 172.

The protruding electrode 174 includes a rectangular electrode RE and a trapezoidal electrode TE. The trapezoidal electrode TE is connected to the body electrode section 172, and has two sides that are inclined with respect to the protrusion direction. The rectangular electrode RE is connected with the trapezoidal electrode. TE along the protrusion direction. The lower spacing distance D1 between lower portions of the protruding electrodes 174 is no smaller than about 3 μm due to a limitation of resolution power when exposed. The lower spacing distance D1 is about 3.5 μm in general.

According to the present exemplary embodiment, the trapezoidal electrode TE of the protruding electrode 174 controls an initial direction of the liquid crystal molecules by the two sides that are inclined with respect to the protrusion direction, so that the response speed of the liquid crystal molecules is improved.

When the protrusion length L of the protruding electrode 174 is constant, the angle between one of the two sides of the trapezoidal electrode TE and the protrusion direction increases as a difference between the lower width T1 of the protruding electrode 174 and the upper width 12 of the protruding electrode 174 increases. Therefore, when the difference between the lower width T1 of the protruding electrode 174 and the upper width T2 of the protruding electrode 174 increases, the force for controlling the initial direction of the liquid crystal molecules increases.

According to the present exemplary embodiment the protruding electrode 174 includes the rectangular electrode RE. Therefore, when the protrusion length L of the protruding electrode 174 is constant, the height of the trapezoidal electrode TE decreases by an amount of the height H2 of the rectangular electrode RE. Therefore, the angle between one of the two sides of the trapezoidal electrode TE and the protrusion direction increases to improve the response speed of the liquid crystal molecules.

In addition, the response speed of the liquid crystal molecules corresponding to the rectangular electrode RE may be improved due to a strong electric field of the common electrode 230 of the second substrate 200 since the rectangular electrode RE is disposed at an upper portion of the protruding electrode 174.

Figure 5:
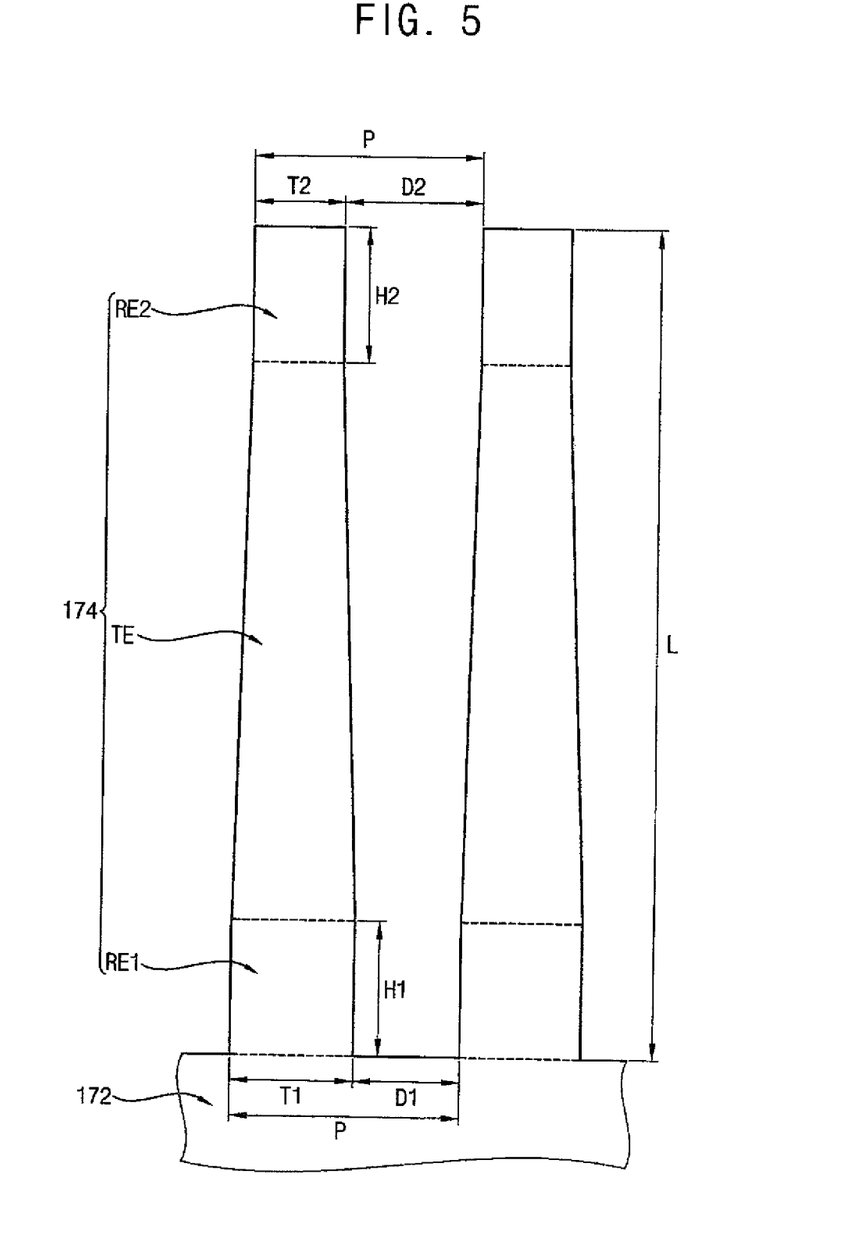
FIG. 5 is an enlarged plan view illustrating a protruding electrode of a pixel electrode for a display apparatus according to an exemplary embodiment of the present invention.

FIG. 5 is an enlarged plan view illustrating a protruding electrode of a pixel electrode for a display apparatus according to an exemplary embodiment of the present invention.

The display apparatus according to the present exemplary embodiment is substantially the same as the display apparatus in FIGS. 1 to 3, except for the protruding electrode 174. Therefore, the same reference numerals will be used to refer to substantially the same elements, and thus any further description thereof will be omitted.

Referring to FIG. 5, the protruding electrodes 174 according to the present exemplary embodiment protrude from the body electrode section 172 along a protrusion direction. The protrusion direction may be the third direction DI3 or the fourth direction DI4 in FIG. 1.

The protrusion length L of the protruding electrode 174 may have a range of about 25 µm to about 27 µm. For example, the protrusion length L of the protruding electrode 174 may be about 26 µm. The interval P between the protruding electrodes 174 may have a range of about 7.5 µm to about 8.5 µm. For example, the interval P between the protruding electrodes 174 is about 8 µm.

The protruding electrode 174 includes a rectangular electrode RE and a trapezoidal electrode TE. The rectangular electrode RE includes a lower rectangular electrode RE1 disposed at a lower portion of the trapezoidal electrode TE and an upper rectangular electrode RE2 disposed at an upper portion of the trapezoidal electrode TE.

The lower rectangular electrode RE1 is connected to the body electrode section 172, and has a rectangular shape, when viewed on a plane. The trapezoidal electrode TE is connected to the lower rectangular electrode RE1, and has two sides inclined with respect to the protrusion direction. For example, the trapezoidal electrode TE may have an isosceles trapezoidal shape symmetric with respect to the protrusion direction. The upper rectangular electrode RE2 is connected to the trapezoidal electrode TE along the protrusion direction, and has a rectangular shape, when viewed on a plane.

Each of the height HI of the lower rectangular electrode RE1 and the height H2 of the upper rectangular electrode RE2 may be about 15% to about 25% of the protrusion length L of the protruding electrode 174. For example, each of the height H1 of the lower rectangular electrode RE1 and the height H2 of the upper rectangular electrode RE2 may be about 20% of the protrusion length L. In detail, the height of the rectangular electrode RE may be in a range of about 3.9 µm to about 6.5 µm, and for example, the height of the rectangular electrode RE is about 5.2 µm. The height H1 of the lower rectangular electrode RE1 may be substantially the same as the height H2 of the upper rectangular electrode RE2.

A lower spacing distance D1 between lower portions of the protruding electrodes 174 is substantially equal to or greater than about 3 µm due to a limitation of resolution power when exposed, and in general, equal to or greater than about 3.5 µm. An upper spacing distance D2 between upper portions of the protruding electrodes 174 is substantially equal to or greater than the lower spacing distance D1.

A sum of a lower width T1 and the lower spacing distance D1 is substantially the same as the interval P of the protruding electrodes 174. Likewise, a sum of an upper width T2 and the upper spacing distance D2 is substantially the same as the interval P of the protruding electrodes 174. Therefore, the upper width T2 of the protruding electrode 174 is substantially equal to or smaller than the lower width T1 of the protruding electrode 174.

When the lower spacing distance D1 is about 4.1 µm and the interval P of the protruding electrodes 174 is about 8.2 µm, the lower width T1 of the protruding electrode 174 is about 4.1 µm. In other words, even when the lower spacing distance D1 is substantially equal to or greater than about 4.0 µm, the lower width T1 of the protruding electrode 174 may be substantially equal to or greater than about 4.0 µm.

Hereinafter, a method of manufacturing the first substrate 100 in FIGS. 1, 2 and 5 will be explained. The method of manufacturing the first substrate 100 according to the present exemplary embodiment is substantially the same as the method of manufacturing the first substrate 100 in FIGS. 1 to 3 except for a step of forming the pixel electrode 170. Therefore, just the step of forming the pixel electrode 170 will be described.

Referring again to FIG. 5, a pixel electrode layer is formed on a protection layer 160 after the protection layer 160 is formed, and the pixel electrode layer is patterned through a photolithography process to form the pixel electrode 170.

The pixel electrode 170 may include the high voltage pixel electrode HPX and the low voltage pixel electrode LPX. The low voltage pixel electrode LPX includes a body electrode section 172 and a plurality of protruding electrodes 174. The body electrode section 172 extends along the third direction DI3 or the fourth direction DI4. The protruding electrodes 174 protrude from the body electrode section 172 along a direction substantially perpendicular to a lengthwise direction of the body electrode section 172.

The protruding electrode 174 includes the lower rectangular electrode RE1 connected to the body electrode section 172, a trapezoidal electrode TE connected to the lower rectangular electrode RE1 and having two sides that are inclined with respect to the protrusion direction, and the upper rectangular electrode RE2 connected to the trapezoidal electrode TE. The lower spacing distance D1 between lower portions of the protruding electrodes 174 is no smaller than about 3 µm due to a limitation of resolution power when exposed. The lower spacing distance D1 is about 3.5 µm in general.

According to the present exemplary embodiment, the trapezoidal electrode TE of the protruding electrode 174 controls an initial direction of the liquid crystal molecules by the two sides that are inclined with respect to the protrusion direction, so that the response speed of the liquid crystal molecules is improved.

When the protrusion length L of the protruding electrode 174 is constant, the angle between one of the two sides of the trapezoidal electrode TE and the protrusion direction increases as a difference between the lower width T1 of the protruding electrode 174 and the upper width T2 of the protruding electrode 174 increases. Therefore, when the difference between the lower width T1 of the protruding electrode 174 and the upper width T2 of the protruding electrode 174 increases, the force for controlling the initial direction of the liquid crystal molecules increases.

According to the present exemplary embodiment, the protruding electrode 174 includes the lower and upper rectangular electrodes RE1 and RE2. Therefore, when the protrusion length L of the protruding electrode 174 is constant, the height of the trapezoidal electrode TE decreases by amounts of the heights H1 and H2 of the lower and upper rectangular electrodes RE1 and RE2, respectively. Therefore, the angle between one of the two sides of the trapezoidal electrode TE and the protrusion direction increases to improve the response speed of the liquid crystal molecules.

In addition, the response speed of the liquid crystal molecules corresponding to the lower rectangular electrode RE1 may be improved due to a strong electric field, since the lower rectangular electrode RE1 is electrically connected to the body electrode section 172.

Additionally, the response speed of the liquid crystal molecules corresponding to the upper rectangular electrode RE2 may be Improved due to a strong electric field of the common electrode 230 of the second substrate 200 since the upper rectangular electrode RE2 is disposed at an upper portion of the protruding electrode 174.

Figure 6:
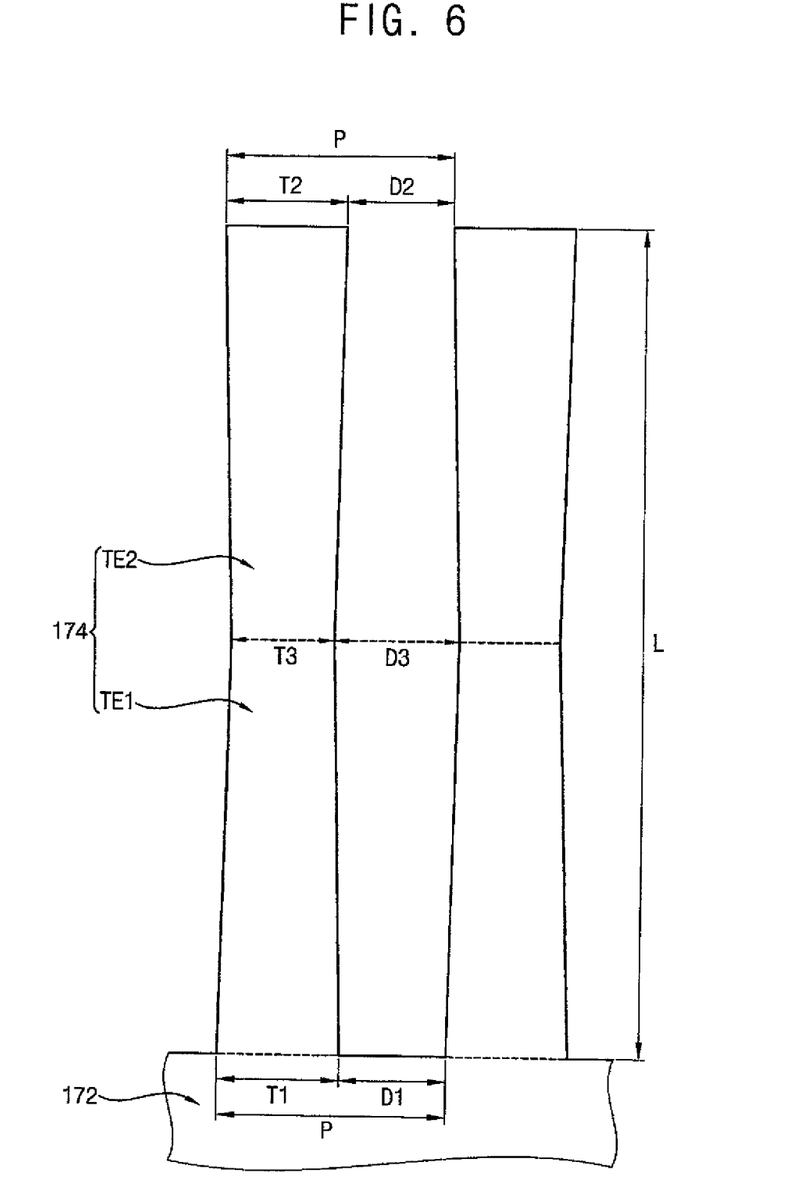
FIG. 6 is an enlarged plan view illustrating a protruding electrode of a pixel electrode for a display apparatus according to an exemplary embodiment of the present invention.

FIG. 6 is an enlarged plan view illustrating a protruding electrode of a pixel electrode for a display apparatus according to an exemplary embodiment of the present invention.

The display apparatus according to the present exemplary embodiment is substantially the same as the display apparatus in FIGS. 1 to 3, except for the protruding electrode 174. Therefore, the same reference numerals will be used to refer to substantially the same elements, and thus any further description thereof will be omitted.

Referring to FIG. 6, the protruding electrodes 174 according to the present exemplary embodiment protrude from the body electrode section 172 along a protrusion direction. The protrusion direction may be the third direction DI3 or the fourth direction DI4 in FIG. 1.

The protrusion length L of the protruding electrode 174 may have a range of about 25 µm to about 27 µm. For example, the protrusion length L of the protruding electrode 174 may be about 26 µm. The interval P between the protruding electrodes 174 may have a range of about 7.5 µm to about 8.5 µm. For example, the interval P between the protruding electrodes 174 is about 8 µm.

The protruding electrode 174 includes a trapezoidal electrode TE, and the trapezoidal electrode TE includes a lower trapezoidal electrode TE1 and an upper trapezoidal electrode TE2.

The lower trapezoidal electrode TE1 is connected to the body electrode section 172, and has two sides that are inclined with respect to the protrusion direction. For example, the lower trapezoidal electrode TE1 may have an isosceles trapezoidal shape symmetric with respect to the protrusion direction.

The upper trapezoidal electrode TE2 is connected to the lower trapezoidal electrode TE1 along the protrusion direction, and has two sides that are inclined with respect to the protrusion direction. For example, the upper trapezoidal electrode TE2 may have an isosceles trapezoidal shape symmetric with respect to the protrusion direction. The lower and upper trapezoidal electrodes TE1 and TE2 may have the same height.

The trapezoidal electrode having the lower and upper trapezoidal electrodes TE1 and TE2 may have a sandglass shape having a center portion that is narrower than its upper and lower portions.

A lower spacing distance D1 between lower portions of the protruding electrodes 174 is substantially equal to or greater than about 3 µm due to a limitation of resolution power when exposed and in general, equal to or greater than about 3.5 µm. An upper spacing distance D2 between upper portions of the protruding electrodes 174 is substantially equal to or greater than the lower spacing distance D1. A central spacing distance D3 between central portions of the protruding electrodes 174 is substantially greater than the upper spacing distance D2.

A sum of a lower width T1 and the lower spacing distance D1 is substantially the same as the interval P of the protruding electrodes 174. Likewise, a sum of an upper width T2 and the upper spacing distance D2 is substantially the same as the interval P of the protruding electrodes 174, and a sum of a central width T3 and the central spacing distance D3 is substantially the same as the interval P of the protruding electrodes 174.

Therefore, the upper width T2 of the protruding electrode 174 is substantially equal to or smaller than the lower width Ti of the protruding electrode 174. Additionally, the central width T3 of the protruding electrode 174 is smaller than the upper width T2 of the protruding electrode 174.

For example, the lower width T1 of the protruding electrode 174 is about 4.5 µm, the upper width T2 of the protruding electrode 174 is about 4.1 µm, and the central width T3 of the protruding electrode 174 is about 3.5 µm.

When the lower spacing distance D1 is about 4.1 µm and the interval P of the protruding electrodes 174 is about 8.2 µm, the lower width T1 of the protruding electrode 174 is about 4.1 µm. In other words, even when the lower spacing distance D1 is substantially equal to or greater than about 4.0 µm, the lower width T1 of the protruding electrode 174 may be substantially equal to or greater than about 4.0 µm.

Hereinafter, a method of manufacturing the first substrate 100 in FIGS. 1, 2 and 6 will be explained. The method of manufacturing the first substrate 100 according to the present exemplary embodiment is substantially the same as the method of manufacturing the first substrate 100 in FIGS. 1 to 3 except for a step of forming the pixel electrode 170. Therefore, just the step of forming the pixel electrode 170 will be described.

Referring again to FIG. 6, a pixel electrode layer is formed on a protection layer 160 after the protection layer 160 is formed, and the pixel electrode layer is patterned through a photolithography process to form the pixel electrode 170.

The pixel electrode 170 may include the high voltage pixel electrode HPX and the low voltage pixel electrode LPX. The low voltage pixel electrode LPX includes a body electrode section 172 and a plurality of protruding electrodes 174. The body electrode section 172 extends along the third direction DI3 or the fourth direction DI4. The protruding electrodes 174 protrude from the body electrode section 172 along a direction substantially perpendicular to a lengthwise direction of the body electrode section 172.

The protruding electrode 174 includes the lower trapezoidal electrode TE1 connected to the body electrode section 172 and the upper trapezoidal electrode TE2 connected to the lower trapezoidal electrode TE1. The trapezoidal electrode TE having the lower and upper trapezoidal electrodes TE1 and TE2 may have a sandglass shape having a center portion that is narrower than its upper and lower portions. The lower spacing distance D1 between lower portions of the protruding electrodes 174 is no smaller than about 3 μm due to a limitation of resolution power when exposed. The lower spacing distance D1 is about 3.5 μm in general.

According to the present exemplary embodiment, both of the lower and upper trapezoidal electrodes TE1 and TE2 of the protruding electrode 174 control an initial direction of the liquid crystal molecules by the two sides that are slanted with respect to the protrusion direction, so that the response speed of the liquid crystal molecules is improved.

Additionally, in the case that the protruding electrode 174 includes the lower and upper trapezoidal electrodes TE1 and TE2 having the same height and the protruding electrode 174 has the height L, heights of the lower and upper trapezoidal electrodes TE1 and TE2 are half of the height L. Therefore, the angle between one of the two sides of the lower and upper trapezoidal electrodes TE1 and TE2 and the protrusion direction increases to improve the response speed of the liquid crystal molecules.

Figure 7:
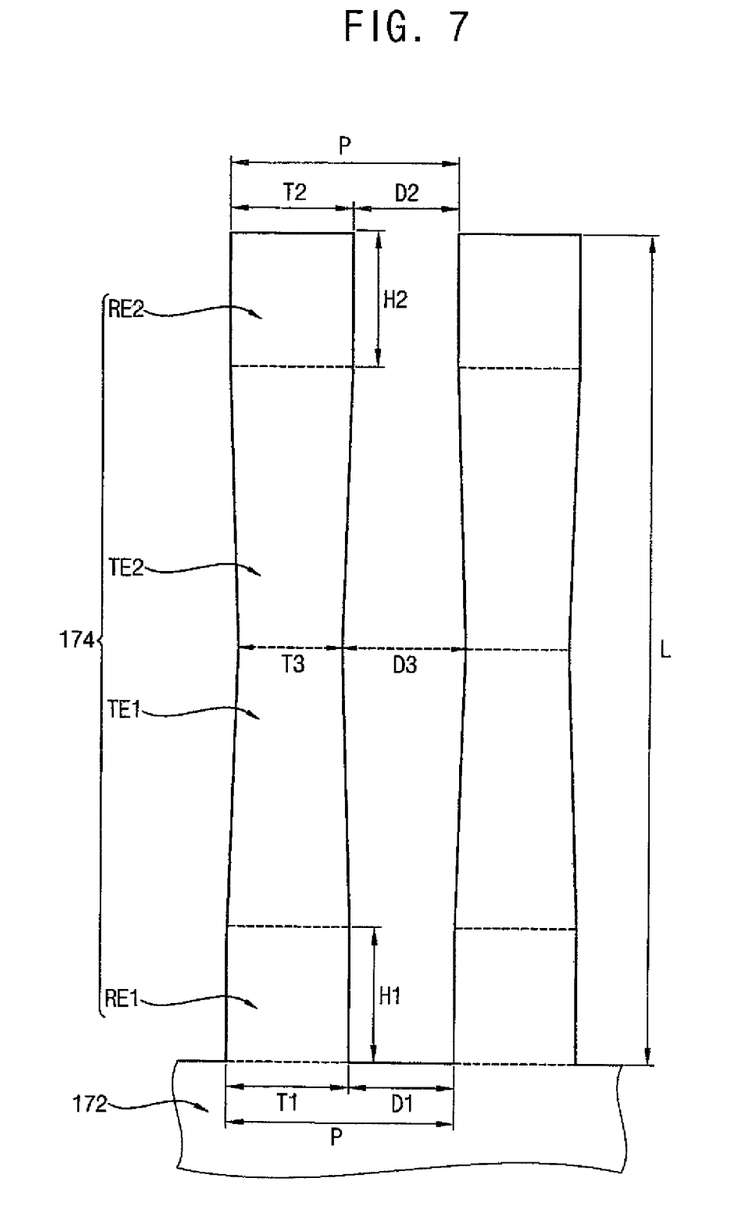
FIG. 7 is an enlarged plan view illustrating a protruding electrode of a pixel electrode for a display apparatus according to an exemplary embodiment of the present invention.

FIG. 7 is an enlarged plan view illustrating a protruding electrode of a pixel electrode for a display apparatus according to an exemplary embodiment of the present invention.

The display apparatus according to the present exemplary embodiment is substantially the same as the display apparatus in FIGS. 1 to 3, except for the protruding electrode 174. Therefore, the same reference numerals will be used to refer to substantially the same elements, and thus any further description thereof will be omitted.

Referring to FIG. 7, the protruding electrodes 174 according to the present exemplary embodiment protrude from the body electrode section 172 along a protrusion direction. The protrusion direction may be the third direction DI3 or the fourth direction DI4 in FIG. 1.

The protrusion length L of the protruding electrode 174 may have a range of about 25 μm to about 27 μm. For example, the protrusion length L of the protruding electrode 174 may be about 26 μm. The interval P between the protruding electrodes 174 may have a range of about 7.5 μm to about 8.5 μm. For example, the interval P between the protruding electrodes 174 is about 8 μm.

The protruding electrode 174 includes a rectangular electrode RE and a trapezoidal electrode TE. The rectangular electrode RE includes a lower rectangular electrode RE1 and an upper rectangular electrode RE2. The trapezoidal electrode TE includes a lower trapezoidal electrode TE1 and an upper trapezoidal electrode TE2.

The lower rectangular electrode RE1 is connected to the body electrode section 172, and has a rectangular shape when viewed on a plane.

The lower trapezoidal electrode TE1 is connected to the lower rectangular electrode RE1 along the protrusion direction, and has two sides that are inclined with respect to the protrusion direction. For example, the lower trapezoidal electrode TE1 may have an isosceles trapezoidal shape symmetric with respect to the protrusion direction.

The upper trapezoidal electrode TE2 is connected to the lower trapezoidal electrode TE1 along the protrusion direction, and has two sides that are slanted with respect to the protrusion direction. For example, the upper trapezoidal electrode TE2 may have an isosceles trapezoidal shape symmetric with respect to the protrusion direction.

The lower and upper trapezoidal electrodes TE1 and TE2 may have substantially the same height. The trapezoidal electrode TE having the lower and upper trapezoidal electrodes TE1 and TE2 may have a sandglass shape having a center portion that is narrower than its upper and lower portions, when viewed on a plane.

The upper rectangular electrode RE2 is connected to the upper trapezoidal electrode TE2 along the protrusion direction, and has a rectangular shape when viewed on a plane.

A lower spacing distance D1 between lower portions of the protruding electrodes 174 is substantially equal to or greater than about 3 μm due to a limitation of resolution power when exposed, and in general, equal to or greater than about 3.5 μm. An upper spacing distance D2 between upper portions of the protruding electrodes 174 is substantially equal to or greater than the lower spacing distance D1. A central spacing distance D3 between central portions of the protruding electrodes 174 is substantially greater than the upper spacing distance D2.

A sum of a lower width T1 and the lower spacing distance D1 is substantially the same as the interval P of the protruding electrodes 174. Likewise, a sum of an upper width T2 and the upper spacing distance D2 is substantially the same as the interval P of the protruding electrodes 174, and a sum of a central width T3 and the central spacing distance D3 is substantially the same as the interval P of the protruding electrodes 174.

Therefore, the upper width T2 of the protruding electrode 174 is substantially equal to or smaller than the lower width T1 of the protruding electrode 174. Additionally, the central width T3 of the protruding electrode 174 is smaller than the upper width T2 of the protruding electrode 174.

For example, the lower width T1 of the protruding electrode 174 is about 4.5 μm, the upper width T2 of the protruding electrode 174 is about 4.1 μm, and the central width T3 of the protruding electrode 174 is about 3.5 μm.

When the lower spacing distance D1 is about 4.1 μm and the interval P of the protruding electrodes 174 is about 8.2 μm, the lower width T1 of the protruding electrode 174 is about 4.1 μm. In other words, even when the lower spacing distance D1 is substantially equal to or greater than about 4.0 μm, the lower width T1 of the protruding electrode 174 may be substantially equal to or greater than about 4.0 μm.

Each of the height H1 of the lower rectangular electrode RE1 and the height H2 of the upper rectangular electrode RE2 may be about 15% to about 25% of the protrusion length L of the protruding electrode 174. For example, each of the height H1 of the lower rectangular electrode RE1 and the height H2 of the upper rectangular electrode RE2 may be about 20% of the protrusion length L. In detail the height of the rectangular electrode RE may be in a range of about 3.9 μm to about 6.5 μm, and for example, the height of the rectangular electrode RE is about 5.2 μm. The height H1 of the lower rectangular electrode RE1 may be substantially the same as the height H2 of the upper rectangular electrode RE2.

One of the lower and upper rectangular electrodes RE1 and RE2 may be omitted.

Hereinafter, a method of manufacturing the first substrate 100 in FIGS. 1, 2 and 7 will be explained. The method of manufacturing the first substrate 100 according to the present exemplary embodiment is substantially the same as the method of manufacturing the first substrate 100 in FIGS. 1 to 3 except for a step of forming the pixel electrode 170. Therefore, just the step of forming the pixel electrode 170 will be described.

Referring again to FIG. 7, a pixel electrode layer is formed on a protection layer 160 after the protection layer 160 is formed, and the pixel electrode layer is patterned through a photolithography process to form the pixel electrode 170.

The pixel electrode 170 may include the high voltage pixel electrode HPX and the low voltage pixel electrode LPX. The low voltage pixel electrode LPX includes a body electrode section 172 and a plurality of protruding electrodes 174. The body electrode section 172 extends along the third direction DI3 or the fourth direction DI4. The protruding electrodes 174 protrude from the body electrode section 172 along a direction substantially perpendicular to a lengthwise direction of the body electrode section 172.

The protruding electrode 174 includes the lower rectangular electrode RE1 connected to the body electrode section 172, the lower trapezoidal electrode TE1 connected to the lower rectangular electrode RE1, the upper trapezoidal electrode TE2 connected to the lower trapezoidal electrode TE1, and the upper rectangular electrode RE2 connected to the upper trapezoidal electrode TE2. The trapezoidal electrode TE having the lower and upper trapezoidal electrodes TE1 and TE2 may have a sandglass shape having a center portion that is narrower than its upper and lower portions. The lower spacing distance D1 between lower portions of the protruding electrodes 174 is no smaller than about 3 μm due to a limitation of resolution power when exposed. The lower spacing distance D1 is about 3.5 μm in general.

According to the present exemplary embodiment both of the lower and upper trapezoidal electrodes TE1 and TE2 of the protruding electrode 174 control an initial direction of the liquid crystal molecules by the two sides that are inclined with respect to the protrusion direction, so that the response speed of the liquid crystal molecules is improved.

Additionally, when the protruding electrode 174 includes both of the lower and upper trapezoidal electrodes TE1 and TE2, the angle between one of the two sides of the lower and upper trapezoidal electrodes TE1 and TE2 and the protrusion direction increases to improve the response speed of the liquid crystal molecules.

Furthermore, the protruding electrode 174 includes the lower rectangular electrode RE1 disposed at a lower portion of the lower trapezoidal electrode TE1, and the upper rectangular electrode RE2 disposed at an upper portion of the upper trapezoidal electrode TE2, so that the heights of the lower and upper trapezoidal electrodes TE1 and TE2 may be reduced. Therefore, the angle between one of the sides of the lower and upper trapezoidal electrodes TE1 and TE2 and the protrusion direction is further increased to improve the response speed of the liquid crystal molecules.

According to the exemplary embodiments of the present invention, a plurality of protruding electrodes protrude from the body electrode section along the protrusion direction, so that the opening region between a high pixel electrode and a low pixel electrode is reduced to improve the optical transmissivity of liquid crystal.

Additionally, the protruding electrodes include the trapezoidal electrode having two sides that are inclined with respect to the protrusion direction, so that a force for controlling the initial direction of the liquid crystal molecules increases.

Furthermore, the protruding electrodes may include the rectangular electrode connected to trapezoidal electrode, so that the angle between one of the two sides of the trapezoidal electrode and the protrusion direction can be increased to further strengthen the force for controlling the initial direction of the liquid crystal molecules.

While the present invention has been described in detail with reference to the exemplary embodiments, those skilled in the art will appreciate that various modifications and substitutions can be made thereto without departing from the spirit and scope of the present invention as set forth in the appended claims.

What is claimed is:

1. A display substrate, comprising:
 a transparent substrate;
 first and second gate lines formed on the transparent substrate;
 first and second data lines crossing the first and second gate lines;
 a thin film transistor electrically connected to the first gate line and the first data line;
 a first pixel electrode including a body electrode section electrically connected to the thin film transistor and a plurality of protruding electrodes protruding from the body electrode section, each of the protruding electrodes including a trapezoidal electrode having two sides that are inclined with respect to a protrusion direction that is a lengthwise direction of the body electrode section; and
 a second pixel electrode,
 wherein the first pixel electrode has a V-shape, the body electrode section is slantingly extended from the first data line to a portion of the second data line adjacent the second gate line to form a first arm of the first pixel electrode and the body electrode section is slantingly extended from the first data line to a portion of the second data line adjacent the first gate line to form a second arm of the first pixel electrode,
 wherein the second pixel electrode has a V-shape and is included within the V-shape of the first pixel electrode, the second pixel electrode has a first arm adjacent to the first arm of the first pixel electrode and a second arm adjacent to the second arm of the first pixel electrode, wherein the first and second arms of the second pixel electrode do not include protruding electrodes.

2. The display substrate of claim 1, wherein each of the protruding electrodes further includes a rectangular electrode connected to the trapezoidal electrode.

3. The display substrate of claim 2, wherein the rectangular electrode is connected between the body electrode section and the trapezoidal electrode.

4. The display substrate of claim 1, wherein the trapezoidal electrode has an isosceles trapezoidal shape symmetric with respect to the protrusion direction.

5. The display substrate of claim 1, wherein a width of a lower portion of the protruding electrode, which is connected to the body electrode section is substantially greater than a width of an upper portion of the protruding electrode.

6. The display substrate of claim 5, wherein a distance between the lower portions of adjacent protruding electrodes is in a range of about 3.0 μm to about 4.0 μm.

7. A method of manufacturing a display substrate, the method comprising:
 forming first and second gate lines on a transparent substrate;
 forming first and second data lines crossing the first and second gate lines;
 forming a thin film transistor that is electrically connected to the first gate line and the first data line;
 forming a first pixel electrode including a body electrode section electrically connected to the thin film transistor and a plurality of protruding electrodes protruding from the body electrode section, each of the protruding electrodes including a trapezoidal electrode having two sides that are inclined with respect to a protrusion direction that is a lengthwise direction of the body electrode section and a rectangular electrode connected to the trapezoidal electrode; and
 forming a second pixel electrode, wherein the first pixel electrode has a V-shape, the body electrode section is slantingly extended from the first data line to a portion of the second data line adjacent the second gate line to form a first arm of the first pixel electrode and the body electrode section is slantingly extended from the first data line to a portion of the second data line adjacent the first gate line to form a second arm of the first pixel electrode, wherein the second pixel electrode has a V-shape and is included within the V-shape of the first pixel electrode, the second pixel electrode has a first arm adjacent to the first arm of the first pixel electrode and a second arm adjacent to the second arm of the first pixel electrode, wherein the first and second arms of the second pixel electrode do not include protruding electrodes.

8. A display apparatus, comprising:

a first substrate having a transparent substrate, a gate line formed on the transparent substrate, a data line crossing the gate line, a thin film transistor electrically connected to the gate line and the data line, and a pixel electrode electrically connected to the thin film transistor;

a second substrate that is opposite to the first substrate; and a liquid crystal layer disposed between the first and second substrates, wherein the pixel electrode comprises a body electrode section electrically connected to the thin film transistor and a plurality of protruding electrodes protruding from the body electrode section, each of the protruding electrodes including a trapezoidal electrode having two sides that are inclined with respect to a protrusion direction that is a lengthwise direction of the body electrode section and a rectangular electrode connected to the trapezoidal electrode, wherein the second substrate comprises a common electrode having a domain dividing groove dividing a region between the common electrode and the pixel electrode into a plurality of domains, wherein the body electrode section has a V-shape the domain dividing groove extends an entire length of a first arm of the V-shape and has a portion that overlaps the data line and extends to the vertex of the V-shape, the overlapped portion being narrower than the data line and tapered as it approaches the vertex.

9. A display apparatus, comprising:

a first substrate having a transparent substrate, a gate line formed on the transparent substrate, a data line crossing the gate line, a thin film transistor electrically connected to the gate line and the data line, and a pixel electrode electrically connected to the thin film transistor;

a second substrate that is opposite to the first substrate; and a liquid crystal layer disposed between the first and second substrates, wherein the pixel electrode comprises a body electrode section electrically connected to the thin film transistor and a plurality of protruding electrodes protruding from the body electrode section, each of the protruding electrodes including a trapezoidal electrode having two sides that are inclined with respect to a protrusion direction that is a lengthwise direction of the body electrode section and a rectangular electrode connected to the trapezoidal electrode, wherein the second substrate comprises a common electrode having a domain dividing groove dividing a region between the common electrode and the pixel electrode into a plurality of domains and extending along a direction, wherein the body electrode section has a V-shape, the domain dividing groove extends an entire length of a first arm of the V-shape and has a portion that overlaps the data line and extends to the vertex of the V-shape, the overlapped portion being narrower than the data line and tapered as it approaches the vertex, wherein the lengthwise direction of the body electrode section is substantially the same as the direction of the domain dividing groove, wherein the protruding electrodes protrude from the body electrode section along a direction substantially perpendicular to the lengthwise direction of the body electrode section.

* * * * *